United States Patent

Martuch

[15] 3,653,143

[45] Apr. 4, 1972

[54] TACTILE INDICATOR FOR FLY LINE

[72] Inventor: Leon L. Martuch, Midland, Mich.

[73] Assignee: Scientific Anglers Inc., Midland, Mich.

[22] Filed: Sept. 9, 1970

[21] Appl. No.: 70,678

[52] U.S. Cl. .......................................................43/44.98
[51] Int. Cl. ..........................................................A01k 91/00
[58] Field of Search..................................................43/44.98

[56] References Cited

UNITED STATES PATENTS

| | | | |
|---|---|---|---|
| 2,250,832 | 7/1941 | Hedge | 43/44.98 |
| 1,846,912 | 2/1932 | Sedgley | 43/44.98 |
| 3,464,140 | 9/1969 | Carabasse | 43/44.98 X |
| 1,914,174 | 6/1933 | Smith | 43/44.98 X |

Primary Examiner—Samuel Koren
Assistant Examiner—J. F. Pitrelli
Attorney—Gordon W. Hueschen and Talivaldis Cepuritis

[57] ABSTRACT

The invention relates to a tactile indicator on a fly casting line to indicate to a fisherman before the initial cast or when the line is being retrieved that the desired casting length of line is extended beyond the tip of the fly rod and that the rod and line are ready for casting.

9 Claims, 4 Drawing Figures

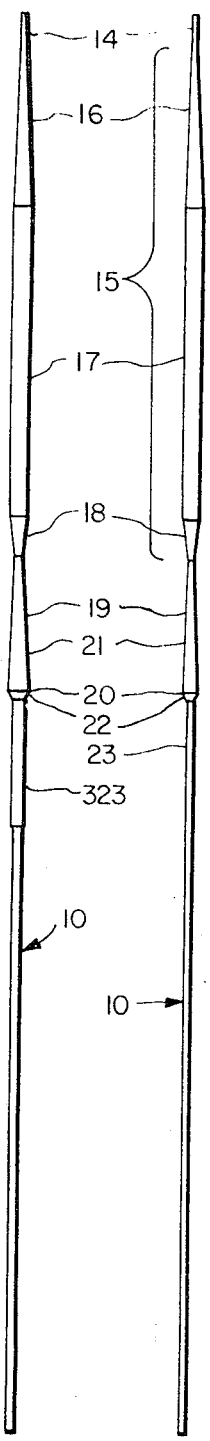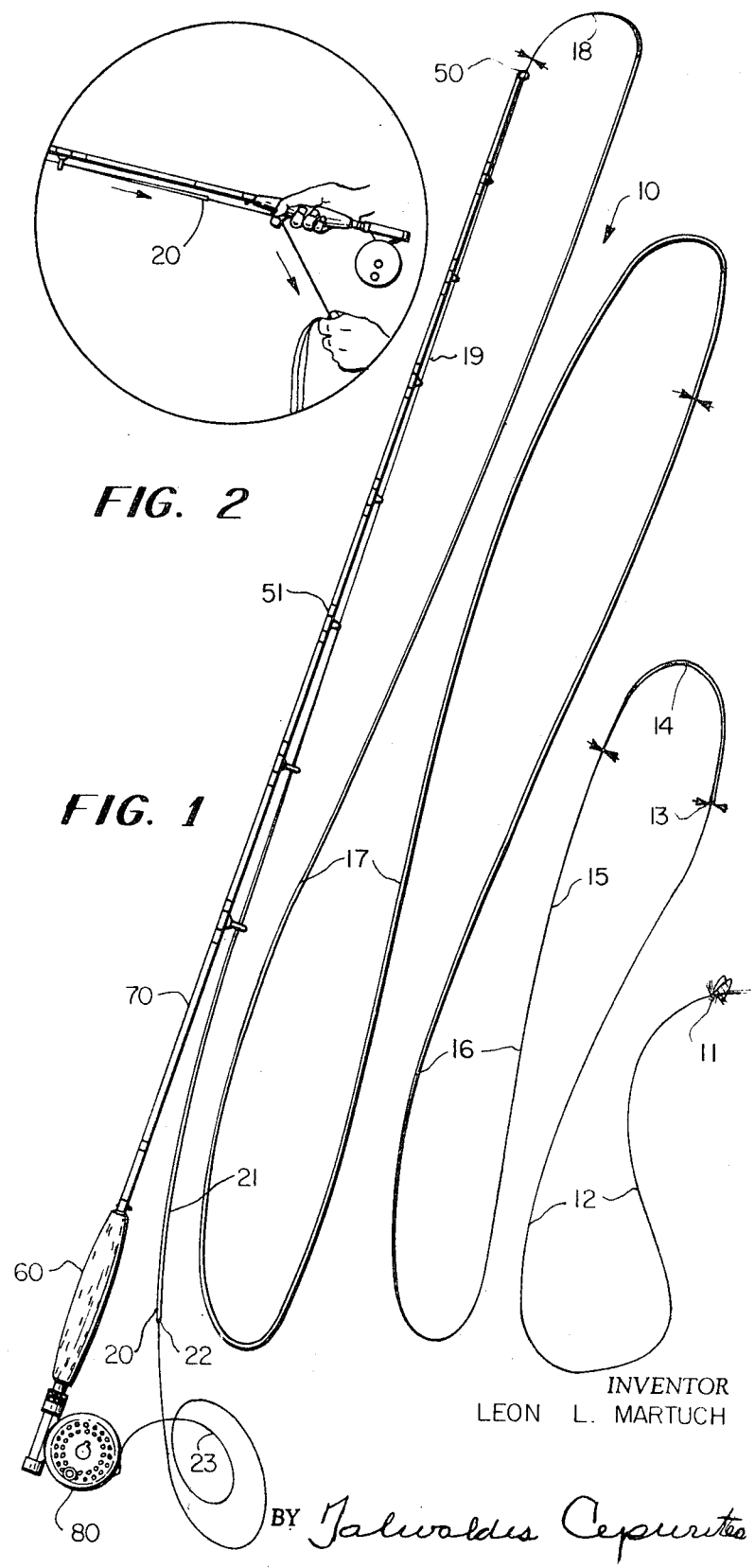
PATENTED APR 4 1972
3,653,143
FIG. 1
FIG. 2
FIG. 3
FIG. 4
INVENTOR
LEON L. MARTUCH
BY Jalwaldis Cepuritis
ATTORNEY 3,653,143

TACTILE INDICATOR FOR FLY LINE

BACKGROUND OF THE INVENTION

In casting with spinning tackle or the like, the weight of the bait or lure being cast pulls the line off the reel and out over the water. In fly casting it is the weight of the line cast which pulls out trailing line. The lure is only along for the ride. In other kinds of casting, the line is stored on a reel of various sorts, preparatory to beginning the cast. In fly casting, all of the line that is to be cast must be pulled from the reel prior to beginning the cast. Because it is the weight of the line which is cast and constitutes the weight to be thrown, the caster must have sufficient line extending beyond the tip of the rod before the cast is begun. If an insufficient length of line is extended beyond the rod tip, there will not be sufficient weight to bring out the action of the rod and the cast will not be satisfactory. In the course of fly casting the fisherman casts the line out and retrieves it until a fish takes the lure. It often happens that the fly line is retrieved to a point where less than a casting length of line extends beyond the rod tip. It then becomes necessary for the fisherman to extend additional line beyond the rod tip before commencing the next cast. On the other hand, if the fisherman has too much line extended beyond the rod tip, his fishing rod is unable to cope with the weight and an unsatisfactory cast will result. Additionally, the extra length of line is cumbersome and difficult for the fisherman to handle.

In the usual practice, a fly fisherman casts the line which in turn carries the fly or lure out onto the body of water. The fly is then allowed to drift with the current back toward the fisherman or a motion is imparted to the fly by the fisherman manipulating the line. Such motion is intended to represent swimming motion of aquatic insects of small bait fish. In either case, the fisherman holds the line in the vicinity of the grip of the rod with the hand that is holding the rod. With the other hand, he retrieves the line. As the line is retrieved, it passes through the fingers of the fisherman's rod-holding hand. The line is normally retrieved in this manner so the fisherman may immediately grasp the line with the fingers of the hand holding the rod, should a fish strike the lure while the other hand is reaching forward for another grip on the line.

In order to cast heavy or bulky lures or to make extremely long casts, it is common to use a weight-forward tapered line. A weight-forward tapered line is a fly casting line with a large diameter section near the forward end. This large diameter section adds weight to the forward end of the line. This weight has the advantage of making long casts more easily than is done with other types of fly line. When a fisherman makes a long cast, this heavy section pulls out the small diameter running line just as in other forms of casting, the lure pulls out the line to which it is attached.

As previously stated, it is necessary that the fisherman has a sufficient length of line beyond the tip of the rod in order to make a proper cast and yet avoid having an excess of line beyond the rod tip.

In the normal situation, the fisherman casts considerably more line than this casting length by allowing the weight of the casting length to pull additional line through the guides of the rod. The line which will be pulled out is usually held loosely in the fisherman's hand or allowed to lie nearby. It is not wound on the reel as in other types of casting. After the cast is made, the fisherman retrieves the line until a casting length remains beyond the rod tip. The fisherman is then in a position to begin another cast.

The fisherman's attention at all times should be, and is directed to the fly or lure, and because his attention is so directed to the fly and not to his rod or line, it often happens that too much line is retrieved to allow the next cast to be made. To correct this, it is necessary to extend additional line to provide the correct amount of weight beyond the rod tip. It is also necessary for the fisherman to estimate what a correct amount of line is and whether it has been extended. This problem is increased considerably when a weight-forward tapered line is being used. With the weight-forward tapered line, it is essential the correct amount of line which provides the casting weight is pendant from the rod tip. It is even more essential to a proper cast that an excess of line not be extended, because the relatively small diameter running line will not impart sufficient energy to the heavier weighted portion of the line to carry the cast forward. The fisherman who has extended too much line while attempting to cast a weight-forward tapered line will encounter difficulty in casting and accelerated wear to his fly line. With a weight-forward tapered line, it is desirable to stop the retrieving of the line just as the rear portion of the "head" or the heavily weighted portion of the line reaches the tip of the rod. Some manufacturers have attempted to give warning of when the "head" reaches the rod tip by dyeing the line with a warning color. But the fisherman cannot watch both the tip of the rod and the fly at the same time and color on the line does not avoid the necessity of the fisherman having to watch two points at the same time. Furthermore, a warning color on the line is of little use in night fishing.

It is therefore an object of this invention to provide a tactile indicator to make a fisherman aware of when the line is ready for a cast at the time of initial cast or during retrieval of the line.

It is also an object of this invention to provide a tactile indicator integrally formed on the line.

Yet another object of this invention is to provide a tactile indicator which will allow the line to shoot through the rod guides without substantially affecting the cast.

Other objects of this invention will become apparent in the following description.

SUMMARY OF THE INVENTION

The invention relates to a fly casting line having a tactile indicator positioned on the line in such a manner as to leave the desired casting length of line pendant from the tip of the rod. The indicator is a protuberance on the line which can be sensed by the fisherman as the line is being retrieved or pulled out for the initial cast.

DETAILED DESCRIPTION OF THE INVENTION

The tactile indicator of this invention allows a fisherman to concentrate on the movement of the fly on the water and not on the amount of line being pulled in. The tactile indicator is used on any type of fly line, including single tapered lines, double tapered lines, weight-forward tapered lines and level lines.

The tactile indicator is a variance in the "feel" of the line which can be sensed by the fisherman as the line passes through the fisherman's fingers while the line is being retrieved. The tactile indicator can be a section of "sandpaper like", waterproof material rolled about the line and adhesively mounted thereon approximately 6 feet to 12 feet from the end of a casting length of line or, in the preferred embodiment, the tactile indicator is integrally formed on the line and is made of the same material as the surface coating of the line and is 6 feet to 12 feet from the end of the weight-forward section. When integrally formed in the line, the indicator is a section having a dimpled, rough or bumpy surface which can be sensed by the fisherman's fingers. In the preferred embodiment, the indicator is a single tapered projection. In the most preferred embodiment the tactile indicator is a streamlined, generally "bullet" shaped protuberance projecting from the line. The contour of the protuberance is of a gently increasing leading taper reaching the maximum thickness for the protuberance and a very sharp trailing taper. The long taper is many times greater than the short taper.

Now having generally described the indicator of this invention, reference is made to the drawings to describe specific embodiments of the invention which are illustrative of the indicator on a weight-forward taper line.

FIG. 1 is a perspective side view of a fly casting fishing line and rod in casting position showing the tactile indicator of the invention;

FIG. 2 is a view depicting a fly casting line being retrieved and shows the tactile indicator thereon just before striking the fingers of a fisherman;

FIG. 3 is an enlarged silhouette view showing an exaggerated contour of weight-forward tapered fly casting line containing the tactile indicator of the invention; and FIG. 4 is an enlarged silhouette view showing the fly casting line of FIG. 3 with the addition of a handling line.

Referring now to the drawings and particularly FIGS. 1–3, there is shown a complete length of fly-casting line generally indicated by the numeral 10, which comprises a tip section 14, a weight-forward head section 15, a rod section 19, and running line 23, a portion of which is withdrawn from reel 80. A leader 12 is tied by a conventional fishing knot 13 to the end of tip 14. A lure 11 is attached to the end of the leader. A conventional fly casting rod 70 comprises a grip 60 and reel 80 which contains running line 23.

The relative relation between the various sections of the fly casting line embodying the invention is shown in FIG. 3. The transitions from one section to another are exaggerated for illustrative purposes. In actuality, the differences in thickness are so slight and the transitions from one section to another are so gradual, that the changes from one section to another are barely discernible to the eye.

The tip section 14 is between about 12 to 32 inches, and preferably 14 to 24 inches long, and between about 0.025 and 0.045 inches thick.

The weight-forward head section 15 comprises a leading taper portion 16, a belly portion 17, and a trailing taper portion 18. The trailing taper 18 is a transitional zone from belly portion 17 to running line 23 as is the leading taper 16 from belly portion 17 to tip section 14. The leading taper is between about 4 and 12 feet and preferably about 10 feet long. The belly portion is between about 14 and 21 and preferably 17 and 20 feet long, and between about 0.040 and 0.065 inches thick. The trailing taper is between about 1½ and 2½ and preferably 2 feet long. The casting length of line therefore would total at least 20 feet.

The rod section 19 is the portion of running line 23 which lies along the rod 70 when the line is set in casting position. The length of the rod section line varies with the length of the rod, however, fly casting rods are made for particular purposes and in each case, the length of the rod section line is the same and can be considered as a class. This length in most cases is between about 6 and 12 feet long and preferably between 7 and 9 feet long, depending upon the particular rod used. The length is measured from the end of the trailing taper 18 along the rod to the trailing taper 22 of indicator 20. The thickness of the rod section of line and also the running line 23 is between about 0.030 and 0.045 inches.

The tactile indicator of this invention is generally indicated by the numeral 20 and comprises a forward taper 21 of generally long profile and a rear taper 22 of generally short and sharp profile, as best seen in FIG. 3. The indicator is integrally formed on line 10 of the same material used in the coating of line 10. The indicator is positioned near the end of rod section line 19 and the length of the rod line includes the indicator length. The indicator has a maximum diameter between about 0.050 and 0.070 inches, and a length of between about 5 inches to about 4 feet. Preferably, the length is about 1 to 3 feet long and about 0.060 inches thick at the maximum thickness. The long taper 21 is of much greater length than the short taper 22 and almost the entire length of the indicator is taken up by the long taper.

In actual practice, as shown in FIG. 2, the warning signal is given by the striking of the short taper 22 against the fisherman's fingers as the running line is being retrieved by being drawn through the fisherman's fingers. The short taper operates as the warning device because of the sudden change in the diameter of the line. Accordingly, the short taper need not be longer than about one-fourth of an inch measured along the long axis of the line. The short taper melds into running line 23 which has a diameter of between about 0.030 and 0.045 inches. The important consideration is that the difference between the running line thickness and the protuberance of the indicator at the maximum thickness is such that a sufficient impact is made on the fisherman's fingers to impart the warning signal. In most cases, the short taper 22 can be about one-fourth to about one-sixteenth of an inch in length. On a line having a running line with a 0.040 inch diameter for example, the short taper is preferably about three thirty-seconds of an inch in length and 0.060 inches in the maximum diameter.

The running line 23 is usually between 35 and 70 feet long and preferably about 40 feet long. The total length of the fishing line used including all its sections is between about 75 and 120 feet long, and preferably between about 90 and 105 feet long.

In the alternate embodiment shown in FIG. 4, a handling line 323 is an integral part of, and is of a heavier cross-section than the running line 23. The handling line comes after the weight-forward head section. The handling line is usually made a part of the better grades of fly lines. In this embodiment, the indicator 20 is a part of the handling line. The thickness dimensions of the indicator are accordingly increased by the additional thickness of the handling line to provide the needed protuberance as heretofore set forth for the other embodiment shown and described. The handling line 323 is of a length which corresponds to the additional amount of running line which is pulled off the reel 80 ready for use, and which will shoot through the line guides when the cast is made. This additional length of running line is illustrated in FIG. 1 and can be up to about 17 feet in length.

In operation, line 10 is drawn off the reel until a casting length of line, which includes lure 11, leader 12, tip 14 and weight-forward head section 15, is pendant from the rod tip-top 50 and the additional amount of line (handling line in the embodiment of FIG. 4) which will "shoot" through the line guides when the cast is made is gathered off the reel 80 ready for use. This places the end of taper section 18 of weight-forward head section 15 approximately at rod tip-top 50. This also places indicator 20 approximately in the vicinity of grip 60 of rod 70 at the beginning of the loosely gathered line. A cast is then made in the usual manner causing the gathered portion of line 10 including indicator 20 to shoot through line guides 51 of the rod substantially without interference. The leading taper 21 of the indicator allows this smooth flow through the line guide. After lure 11 is on the water, line 10 is drawn back in by the fisherman. As shown in FIG. 2, a fisherman usually holds the rod in one hand and retrieves the line through the fingers of that same hand by pulling in the line with the other hand. When the relatively short taper 22 of the indicator strikes the fisherman's fingers, the fisherman stops the retrieval and is ready to cast a second time. At the time the tactile signal is received, the rear taper 18 of the weight-forward section 15 is approximately in the vicinity of the rod of tip-top 50 and the proper amount of line to provide the correct casting weight is pendant from the rod tip.

Although the invention has been particularly disclosed for a line with a protuberance, it is to be understood that the invention is applicable for other types of tactile indicators. The foregoing embodiments are presented by way of example only and the invention is not to be unduly restricted thereby, since modifications may be made in the line and indicator without departing from the spirit of this invention.

What is claimed is:

1. A fly line usable with a casting rod and the like, comprising a tactile indicator on said fly line and positioned approximately the length of the rod from the rear end of a casting length of line, said casting length of line being at least 20 feet long, said indicator being a projection on said line between about 5 inches and 4 feet long having a leading forwardly directed taper and a trailing rearwardly directed taper, said leading taper being longer than said trailing taper.

2. A fly line according to claim 1, wherein said line is a weight-forward line and said indicator is positioned between about 6 and 12 feet from the end of the weight-forward section.

3. A fly line according to claim 1 wherein said projection of said indicator has a maximum thickness between about 0.050 and 0.070 inches.

4. A fly line according to claim 1 wherein said trailing taper of said indicator is not greater than one-fourth of an inch long when measured along the long axis of the line.

5. A fly line according to claim 1 wherein said indicator is adhesively mounted on said line.

6. A fly line according to claim 1 wherein said indicator is an integral part of said line.

7. A fly line according to claim 1 wherein said line comprises a handling line and said indicator is integral therewith.

8. A fly line usable with a casting rod and the like, comprising a tactile indicator on said fly line and positioned approximately the length of the rod from the rear end of a casting length of line, said line having a weighted-forward section wherein said indicator is a double tapered projection between about 5 inches and 4 feet in length, having a leading forwardly directed taper and a trailing rearwardly directed taper, said leading taper being substantially longer than said trailing taper, said projection having a maximum diameter between 0.050 and 0.070 inches positioned between about 7 and 9 feet from the rearward end of said weighted section.

9. A fly line according to claim 8 wherein said projection is about 1 and 3 feet long with maximum thickness of about 0.060 inches, said trailing taper being between about one-sixteenth and one-fourth of an inch long.

* * * * *